July 14, 1931.  J. B. JEWETT, JR  1,814,556
AIRPLANE CONSTRUCTION AND METHOD THEREFOR
Filed April 15, 1929   2 Sheets-Sheet 1
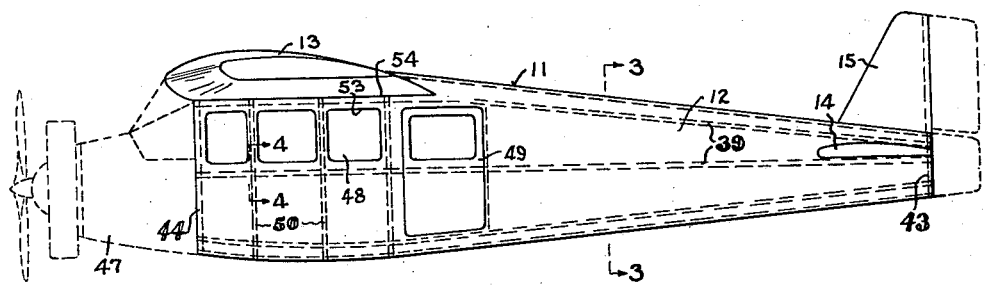
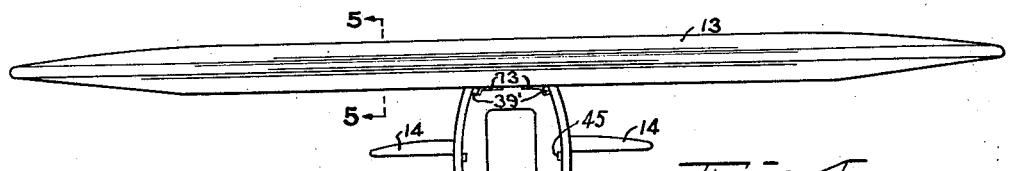
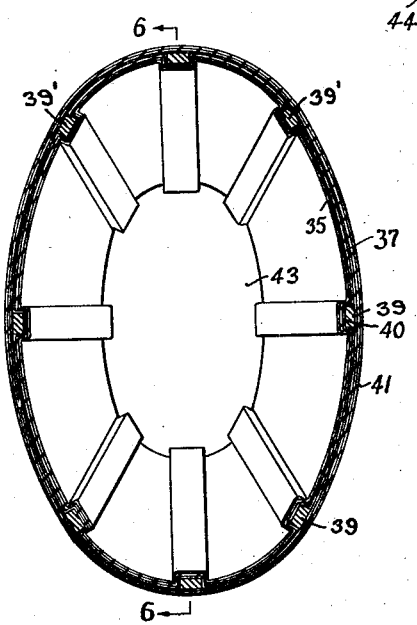
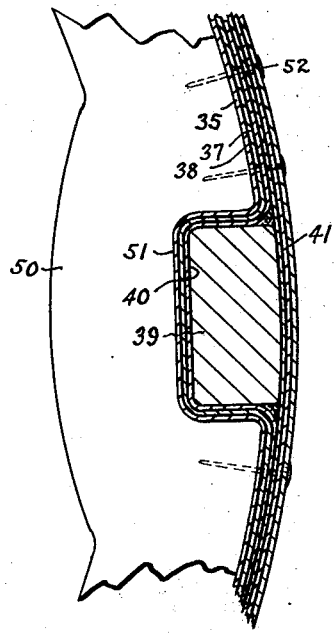
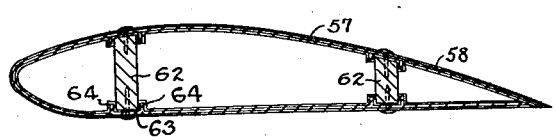
INVENTOR.

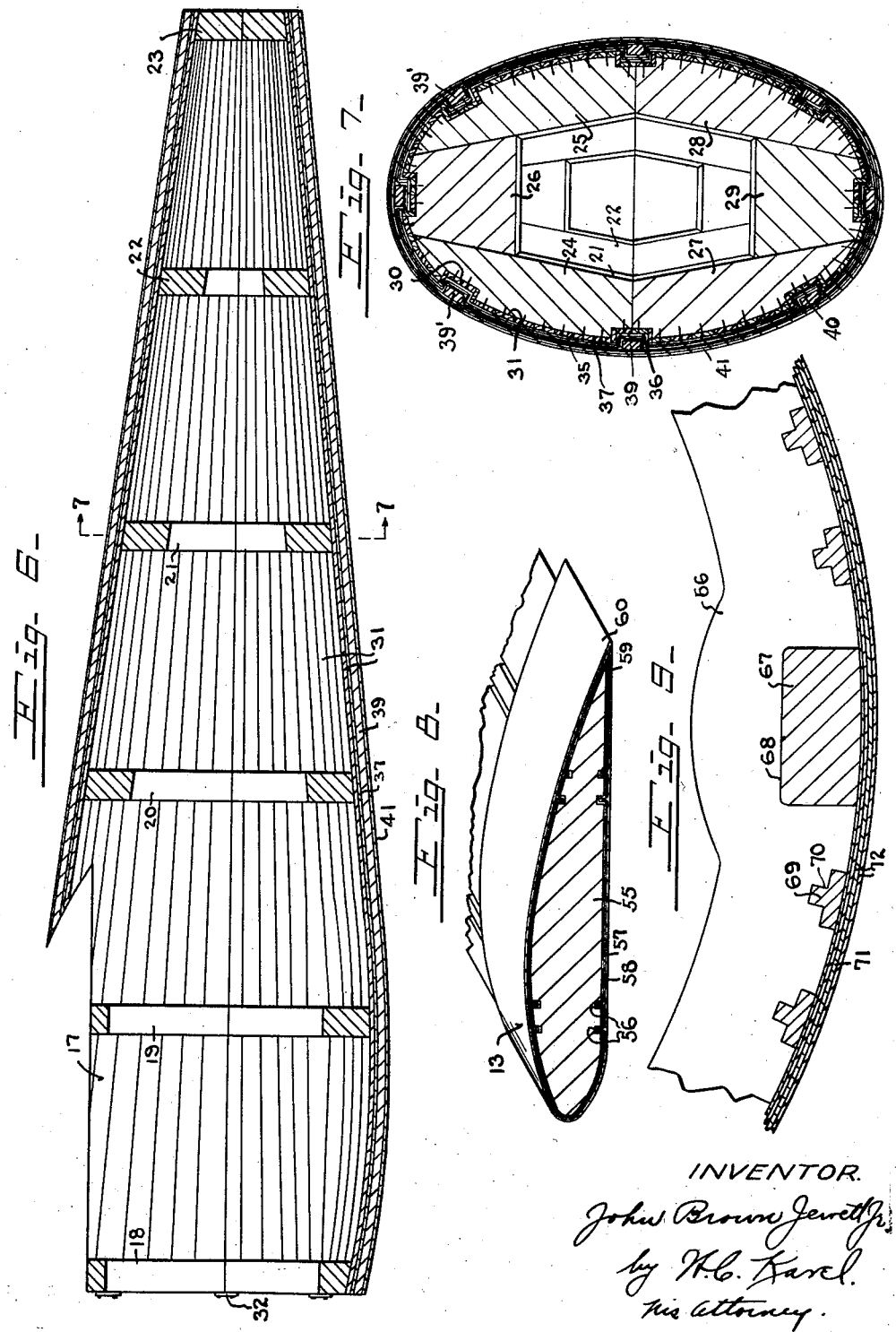

Patented July 14, 1931

1,814,556

UNITED STATES PATENT OFFICE

JOHN BROWN JEWETT, JR., OF NEWTOWN, OHIO

AIRPLANE CONSTRUCTION AND METHOD THEREFOR

Application filed April 15, 1929. Serial No. 355,145.

The invention relates to new and useful improvements in airplane construction.

It has for its object the construction of the fuselage, wings and fins, built up of successive layers of paper glued together. A further object is to provide the fuselage with longérons secured within the layers of paper, forming an integral structure. A still further object is the method for forming the fuselage, wing and fin members.

The invention will be further readily understood from the following description and claims, and from the drawings, in which latter:—

Fig. 1 is a side elevation of my device.

Fig. 2 is a front elevation of the same.

Fig. 3 is a cross section of the same, taken on the line 3—3 of Fig. 1.

Fig. 4 is a sectional detail view, taken on the line 4—4 of Fig. 1.

Fig. 5 is a cross section of a wing taken on the line 5—5 of Fig. 2.

Fig. 6 is a longitudinal cross section, taken in the plane of the line 6—6 of Fig. 3 with the mold in place.

Fig. 7 is a cross section of the same, taken on the line of 7—7 of Fig. 6.

Fig. 8 is a sectional perspective view of the wing with the mold in place, taken on the line 5—5 of Fig. 2.

Fig. 9 is an enlarged detail view showing a modified form of construction for the fuselage.

In the usual construction of airplanes, a complicated superstructure is needed to form the frame work for the fuselage and wings to which the covering is secured. My invention relates to an improved construction and method for forming the fuselage, wing members, and other parts; such as fins, which require a hollow structure to eliminate weight.

I have shown an airplane generally at 11, which comprises a fuselage 12, wings 13, fins 14, and tail 15.

I prefer to use a mold 17, for forming the fuselage comprising a series of bulkheads 18, 19, 20, 21, 22, and 23. Each bulkhead comprises sections 24, 25, 26, 27, 28, and 29. The outer surfaces of these bulkheads are shaped to the desired form of the interior of the fuselage. Recesses 30 are provided in each bulkhead, the number and shape of such recesses depending on the number and shape of the longérons desired in the finished fuselage. Strips 31 are tacked or otherwise suitably secured to the outer surface of the bulkheads, whereby the sections 24, 25, 26, 27, 28, and 29 will be connected to form a unit extending the full length of the desired fuselage.

The sections of the mold are assembled with the sections of the end bulkheads locked together, which may be accomplished by means of latches 32.

With the mold assembled a layer of paper 35, preferably moistened to give it a temporary adhesion, is placed about the outer surface of the mold and fitted in the recesses 36, formed by the strips 31. Several layers of paper 37, are then applied with a suitable adhesive substance 38, between each layer to firmly secure each succeeding layer to the layer of paper beneath it.

A suitable number of layers of paper are thus secured to each other until such thickness is reached which is practically half the desired thickness of the wall. Longérons 39, are cemented in the recesses 40, formed by the layers of paper received in the recesses 36. A suitable number of these longérons extending the full length of the fuselage are used.

Layers of paper 41 are then cemented over the longérons with an adhesive substance 38 between each layer until the desired thickness of the wall is reached.

The body thus formed is allowed to set and dry, after which the latches 32 on the mold are released for collapsing the mold and withdrawing it. The body thus formed is an integral structure.

A bulkhead 43 is secured to the rear end of the structure, being secured to the longérons in any suitable manner. The fins 14 and tail 15 are secured to the longérons and bulkhead.

A front bulkhead 44 is recessed as at 45 to receive the longérons and is secured to the longérons and the shell by means of tacks. This bulkhead is provided with an opening 46, large enough to permit access of the pilot to the pilot's cabin.

The pilot's cabin is part of the housing 47 which may be of steel or other suitable material and is attached to the front bulkhead and longérons in any suitable manner.

In cabin planes, windows 48 and a door 49 are desirable. Therefore, I provide members 50 shaped to fit the interior of the shell. The members 50 are provided with recesses 51 into which the longérons extend. The members are secured within the shell by means of tacks 52. The wall of the fuselage is cut out as at 53 to provide windows after the wall of the fuselage has been formed. The windows can be secured between a pair of longérons and members 50 or the frames of the windows and door can be molded and secured within the laminated paper shell similar to the method of securing the longérons in place. The door 49 is cut out of the body portion and suitably hinged and secured thereto.

The front upper portion of the fuselage is cut away as at 54 to receive the wing members or this may be so formed during the molding process.

The wings 13 of the plane are molded about a mold 55. The mold is provided with recesses 56. The paper is applied in the same manner as in the construction of the fuselage, that is: a moistened layer 57 is applied to the mold and formed into the recesses. Several layers are then applied with a suitable adhesive substance 58 between each layer until the desired thickness is reached. The mold remains within the paper shell until the adhesive substance has dried.

The mold in the wing is removed by spreading the ends 59, 60 of the formed wing sufficient to withdraw the mold. The ends 59, 60 are then suitably secured together.

Spars 62 are then positioned in the recesses 63 between the lugs 64, formed in the shell, and tacked in place. If additional strength is desired, drag-wires and compression members can be attached to the spars 62.

The fins 14 are constructed in a manner similar to the construction of the wings.

In Fig. 9 I show a modified form of my invention wherein the fuselage is built up of members 66 spaced at desired intervals throughout the length of the fuselage.

Longérons 67 are received in recesses 68 in the members and small strips 69 are received in recesses 70 in the members between the main longérons. The paper 71 is glued about this shell with an adhesive substance 72 between each layer.

The wings 13 are secured to the longérons 39' by suitable means, which may be plates 73 secured to the respective longérons 39' and the spars 62.

From the foregoing it will be readily seen that I have devised a simple method of construction for airplanes, combining great strength with a minimum amount of weight. This construction permits a maximum amount of space within the fuselage which is very desirable in planes carrying passengers and goods.

Having thus fully described my invention, what I claim as new and desire to secure by Letters Patent, is:

1. The method of constructing the fuselage of an airplane, comprising a mold, said mold provided with recesses, successive layers of paper secured together applied to said mold with recesses formed therein, longérons secured in said formed recesses, additional layers of paper secured together and to said longérons and said first named layers for forming an integral structure.

2. The method of constructing the wing members of an airplane comprising a mold, recesses in said mold, successive layers of paper secured together applied to said mold forming lugs on the molded member, said mold removed and longitudinal members secured between said lugs.

3. A fuselage for an airplane comprising successive layers of paper secured together with recesses formed therein, longérons secured in said recesses and additional layers of paper secured together and to said longérons and said first named layers for forming an integral structure.

4. A wing member for an airplane comprising successive layers of paper secured together, lugs formed on the inner surface of said member and longitudinal members secured between said lugs.

In testimony whereof, I have hereunto signed my name.

JOHN BROWN JEWETT, Jr.